(12) United States Patent
Kubota et al.

(10) Patent No.: US 10,363,872 B2
(45) Date of Patent: Jul. 30, 2019

(54) PERIPHERY MONITORING DEVICE

(71) Applicant: AISIN SEIKI KABUSHIKI KAISHA, Kariya-shi, Aichi (JP)

(72) Inventors: Naotaka Kubota, Kariya (JP); Kazuya Watanabe, Anjo (JP); Kinji Yamamoto, Anjo (JP); Takayuki Nakasho, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 15/562,979

(22) PCT Filed: Mar. 29, 2016

(86) PCT No.: PCT/JP2016/060196
§ 371 (c)(1),
(2) Date: Sep. 29, 2017

(87) PCT Pub. No.: WO2016/158984
PCT Pub. Date: Oct. 6, 2016

(65) Prior Publication Data
US 2018/0111553 A1 Apr. 26, 2018

(30) Foreign Application Priority Data
Apr. 2, 2015 (JP) ................... 2015-076236

(51) Int. Cl.
*H04N 7/18* (2006.01)
*B60R 1/00* (2006.01)
(Continued)

(52) U.S. Cl.
CPC ............ *B60R 1/00* (2013.01); *B60R 11/0235* (2013.01); *B60R 11/04* (2013.01); *B60R 21/00* (2013.01);
(Continued)

(58) Field of Classification Search
CPC ......................................................... B60R 1/00
(Continued)

(56) References Cited

U.S. PATENT DOCUMENTS 6,131,965 A * 10/2000 Trammell, Jr. ......... E05B 77/26
 292/1
6,580,373 B1 * 6/2003 Ohashi ...................... B60R 1/00
 340/425.5

(Continued)

FOREIGN PATENT DOCUMENTS

JP 3797343 B2 7/2006
JP 4724522 B2 7/2011
(Continued)

OTHER PUBLICATIONS

Communication dated Mar. 7, 2018 from the European Patent Office in counterpart application No. 16772865.8.

(Continued)

*Primary Examiner* — Leron Beck
(74) *Attorney, Agent, or Firm* — Sughrue Mion, PLLC

(57) ABSTRACT

A periphery monitoring device according the embodiment comprising: a first storage that stores therein road surface information in a moving direction of a vehicle including a plurality of wheels; a controller that generates underfloor information on an underfloor region of the vehicle from the road surface information, the underfloor region including at least part of a region of all the wheels; a second storage that is nonvolatile and stores therein the underfloor information when the vehicle ends driving; and a display that displays the underfloor information when the vehicle starts driving.

8 Claims, 9 Drawing Sheets

(51) Int. Cl.
  *B60R 21/00* (2006.01)
  *G06K 9/00* (2006.01)
  *B60R 11/02* (2006.01)
  *B60R 11/04* (2006.01)

(52) U.S. Cl.
  CPC .......... *G06K 9/00791* (2013.01); *H04N 7/18* (2013.01); *B60R 2300/105* (2013.01); *B60R 2300/602* (2013.01); *B60R 2300/802* (2013.01)

(58) Field of Classification Search
  USPC ........................................................ 348/148
  See application file for complete search history.

(56) References Cited

U.S. PATENT DOCUMENTS

| | | | | |
|---|---|---|---|---|
| 6,847,394 B1* | 1/2005 | Hansen | ................ | H04N 7/18 348/82 |
| 7,102,665 B1* | 9/2006 | Chandler | ........... | G01N 21/8806 348/148 |
| 7,502,685 B2* | 3/2009 | Nakamura | ......... | G01C 21/3632 340/988 |
| 7,822,539 B2* | 10/2010 | Akiyoshi | ............. | G01C 21/343 340/989 |
| 8,290,213 B2* | 10/2012 | Chen | ...................... | G06K 9/325 382/105 |
| 8,344,374 B2* | 1/2013 | Yamazaki | ........... | H01L 27/1214 257/43 |
| 8,700,329 B2* | 4/2014 | Miyazaki | ............ | G09B 29/102 701/408 |
| 8,849,027 B2* | 9/2014 | Henry | ..................... | G01J 3/52 382/167 |
| 8,874,367 B2* | 10/2014 | Vicharelli | .......... | G01C 21/3469 701/423 |
| 9,318,009 B2* | 4/2016 | Pederson | ........... | G07C 9/00158 |
| 9,415,754 B2* | 8/2016 | Eskridge | .................. | B60T 7/22 |
| 9,573,524 B2* | 2/2017 | Kim | .......................... | B60R 1/00 |
| 2003/0185340 A1* | 10/2003 | Frantz | ................ | G01N 21/8806 378/57 |
| 2004/0199785 A1* | 10/2004 | Pederson | ........... | G07C 9/00158 340/293 |
| 2005/0270373 A1* | 12/2005 | Trela | ........................ | H04N 7/18 348/143 |
| 2006/0262190 A1* | 11/2006 | Millar | ................ | G06K 9/00577 348/148 |
| 2007/0040911 A1* | 2/2007 | Riley | ..................... | H04N 7/181 348/148 |
| 2007/0273760 A1* | 11/2007 | Morrison | ............... | G06T 7/0004 348/51 |
| 2008/0100741 A1* | 5/2008 | Fujita | ..................... | G09G 5/227 348/445 |
| 2008/0211914 A1* | 9/2008 | Herrera | .................... | H04N 7/18 348/148 |
| 2009/0261966 A1* | 10/2009 | Cutchis | ............ | G08B 13/19647 340/522 |
| 2009/0323046 A1* | 12/2009 | Tan | .......................... | E01H 1/00 356/4.01 |
| 2010/0134593 A1 | 6/2010 | Kakinami | | |
| 2010/0290030 A1* | 11/2010 | Groitzsch | ............. | G01S 17/325 356/28.5 |
| 2012/0072073 A1* | 3/2012 | Groitzsch | ................ | B60T 8/172 701/41 |
| 2013/0093583 A1* | 4/2013 | Shapiro | .................. | G01S 15/931 340/436 |
| 2013/0128048 A1 | 5/2013 | Okajima | | |
| 2013/0278771 A1* | 10/2013 | Magoun | .................. | H04N 5/33 348/148 |
| 2014/0236514 A1* | 8/2014 | Icove | ..................... | G01V 3/081 702/65 |
| 2015/0145999 A1* | 5/2015 | Kim | .......................... | B60R 1/00 348/148 |
| 2015/0279017 A1* | 10/2015 | Tamura | ............... | G06K 9/00791 382/103 |
| 2016/0001704 A1 | 1/2016 | Nakasho et al. | | |
| 2016/0119587 A1* | 4/2016 | Tan | .......................... | B60R 1/00 348/148 |
| 2016/0129999 A1* | 5/2016 | Mays | .................... | B64C 39/024 701/2 |

FOREIGN PATENT DOCUMENTS

JP   5067632 B2   11/2012
WO   2014/156220 A1   10/2014

OTHER PUBLICATIONS

International Search Report for PCT/JP2016/060196 dated Jun. 28, 2016.

* cited by examiner

PERIPHERY MONITORING DEVICE

CROSS REFERENCE TO RELATED APPLICATIONS

This application is National Stage application of International Application No. PCT/JP2016/060196, filed Mar. 29, 2016, which designates the United States, incorporated herein by reference, and which claims the benefit of priority from Japanese Patent Application No. 2015-076236, filed Apr. 2, 2015, the entire contents of which are incorporated herein by reference.

TECHNICAL FIELD

The present invention relates to a periphery monitoring device.

BACKGROUND ART

Conventionally, driver assistance techniques are known, which use a display device that displays, as underfloor information, an image of a part of the ground below the floor of a vehicle such as an automobile, that is, a region behind the rear wheels, for example.

CITATION LIST

Patent Literature

Patent Document 1: Japanese Patent No. 3797343
Patent Document 2: Japanese Patent No. 4724522
Patent Document 3: Japanese Patent No. 5067632

SUMMARY OF INVENTION

Problem to be Solved by the Invention

However, such conventional techniques may be insufficient to assist drivers since displayed images are only of the region behind the rear wheels.

Means for Solving Problem

A periphery monitoring device comprising: a first storage that stores therein road surface information in a moving direction of a vehicle including a plurality of wheels; a controller that generates underfloor information on an underfloor region of the vehicle from the road surface information, the underfloor region including at least part of a region of all the wheels; a second storage that is nonvolatile and stores therein the underfloor information when the vehicle ends driving; and a display that displays the underfloor information when the vehicle starts driving.

As described above, the periphery monitoring device displays the underfloor information including the region of all the wheels of the vehicle. Thereby, the periphery monitoring device can provide the driver the underfloor information including the region around all the wheels of the vehicle. In addition, the periphery monitoring device stores the underfloor information in the nonvolatile second storage when the vehicle ends driving. Thus, upon start of driving, the periphery monitoring device requires substantially no information processing such as image processing, so that it can provide the underfloor information quickly.

In the periphery monitoring device, wherein after the vehicle starts driving, the controller may control the display to display synthetic information in which of the underfloor information and current ambient information that corresponds to current ambient information on the vehicle are synthesized. Thereby, the periphery monitoring device can provide the underfloor information that cannot be obtained at the time of providing the current information after start of driving, and provide current vehicle ambient information.

In the periphery monitoring device, wherein the controller may control the display to display the underfloor information and the current ambient information in different formats. Thus, the periphery monitoring device enables the driver to recognize that the underfloor information and the current ambient information are based on different situations.

In the periphery monitoring device, wherein the road surface information is a captured image of a road surface; the current ambient information is a captured image of current surroundings of the vehicle; and the controller controls the display to display a combination of an image of the underfloor information in one image format and an image of the current ambient information in a color image format, the one image format being selected from an image format group of a monochromatic image, a gray image, and a sepia image. In this manner, the periphery monitoring device displays the image of the underfloor information and the image of the current ambient information in different color image formats; therefore, the driver can easily recognize that these images are based on different situations.

In the periphery monitoring device, wherein the second storage may store therein past ambient information that corresponds to ambient information on the vehicle before the vehicle ends driving; and the controller may control the display to display a combination of the road surface information and the past ambient information. Thus, the periphery monitoring device obtains the underfloor information and the past ambient information from the second storage, and therefore can provide the driver the ambient information quickly without obtaining the ambient information after start of driving.

In the periphery monitoring device, wherein the controller may control the display to display the underfloor information on the underfloor region of the vehicle, the underfloor region ranging from a rear end of a front wheel to a front end of a rear wheel in the moving direction of the vehicle. Thereby, the periphery monitoring device can provide the driver the underfloor information including the region ranging from the rear end of the front wheels to the front end of the rear wheels.

In the periphery monitoring device, wherein the controller may control the display to display the underfloor information on the underfloor region of the vehicle, the underfloor region including a region where all the wheels connect a ground. The periphery monitoring device can provide the driver the underfloor information including the region where all the wheels connect a ground.

DESCRIPTION OF EMBODIMENTS

Through the following embodiment, a vehicle 1 including wheels (for example, four wheels) may be, for example, an automobile using an internal-combustion engine (not shown) as a power source (internal-combustion engine automobile), or an automobile using a motor (not shown) as a power source (electric automobile or a fuel cell automobile). Alternatively, the vehicle 1 may be an automobile using both of them as a power source (hybrid automobile). The vehicle 1 can include various kinds of transmissions or various kinds of devices (systems or components) necessary to drive the internal-combustion engine or the motor. Method, the number, or layout of the devices for driving wheels 3 of the vehicle 1 can be set variously.

Figure 1:
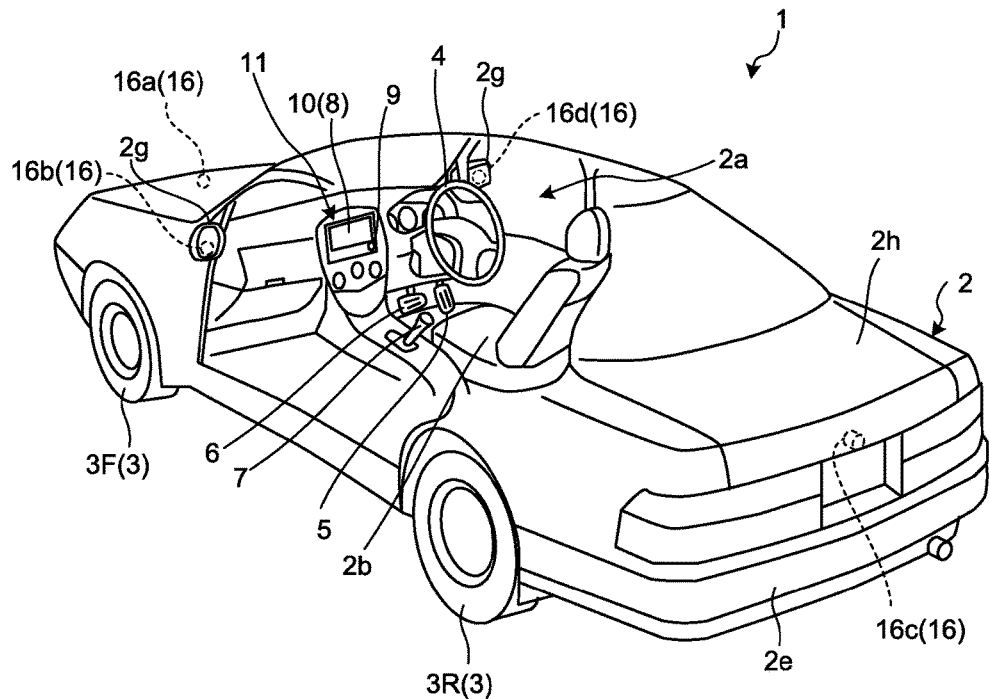
FIG. 1 is a perspective view illustrating one example of a transparent state of a part of a vehicle cabin including a periphery monitoring device according to an embodiment.

As illustrated in FIG. 1, a vehicle body 2 according to the embodiment forms a cabin 2a which a passenger (not shown) rides. In the cabin 2a, a steering 4, an accelerator 5, a brake 6, and a transmission 7 are provided facing a seat 2b of a driver as a passenger. In the present embodiment, for example, the steering 4 is a steering wheel protruding from a dashboard (instrument panel), and the accelerator 5 is an accelerator pedal positioned at the driver's feet. The brake 6 is a brake pedal positioned at the driver's feet, and the transmission 7 is a shift lever protruding from a center console. These elements are not limited to the above examples.

The cabin 2a is equipped with a display device 8 (display output) and a sound output device 9 (sound output). The display device 8 is, for example, a liquid crystal display (LCD) or an organic electroluminescent display (OLED). The sound output device 9 is, for example, a speaker. In the present embodiment, for example, the display device 8 is covered with a transparent manipulation input 10 (for example, a touch panel). Passengers can view video (image) on the screen of the display device 8 through the manipulation input 10. Passengers can enter manipulation inputs (command inputs) by, for example, touching, pressing, or moving the manipulation input 10 with a finger at a position corresponding to the video (image) on the screen of the display device 8. In the present embodiment, for example, the display device 8, the sound output device 9, and the manipulation input 10 are provided to a monitor device 11 positioned at a center of the dashboard in vehicle width direction (horizontal direction). The monitor device 11 can include a manipulation input (not shown) such as a switch, a dial, a joystick, or a push button. Another sound output device (not shown) may be provided not to the monitor device 11 but at a different position in the cabin 2a, and sound may be output not from the sound output device 9 of the monitor device 11 but from another sound output device. In the present embodiment, for example, the monitor device 11 also functions as a navigation system or an audio system; however, the monitor device for the periphery monitoring device may be provided separately from these systems.

Figure 2:
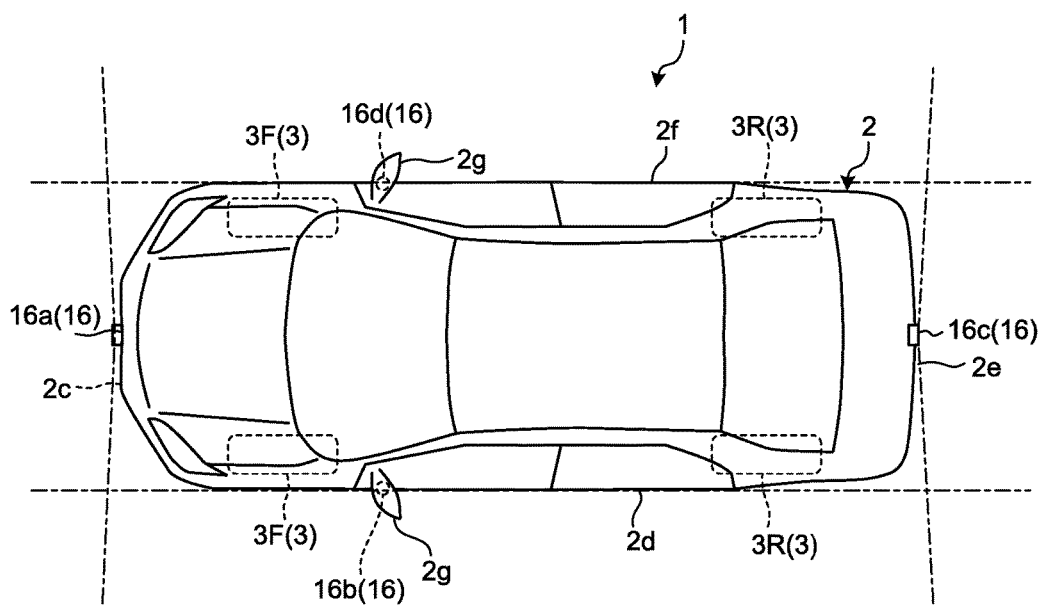
FIG. 2 is a plan view (bird's eye view) illustrating one example of the vehicle including the periphery monitoring device according to the embodiment.
Figure 3:
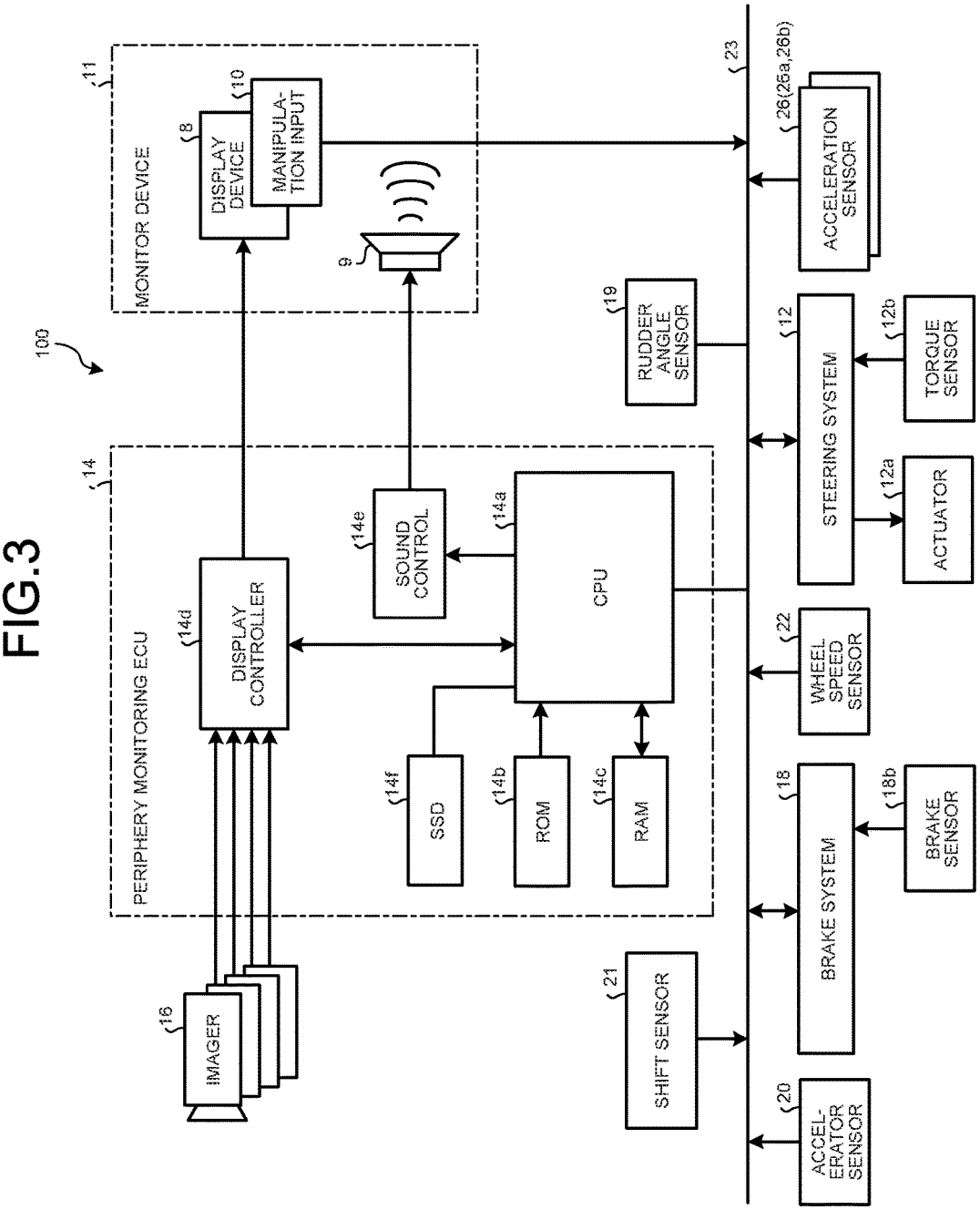
FIG. 3 is a block diagram illustrating one example of a periphery monitoring system including the periphery monitoring device according to the embodiment.

As illustrated in FIG. 1 and FIG. 2, in the present embodiment, for example, the vehicle 1 is a four-wheeled vehicle (four-wheeled automobile) including two right and left front wheels 3F, and two right and left rear wheels 3R. The tire angle of the front wheels 3F, for example, changes (steers) depending on the manipulation of the steering 4 (steering wheels). A steering system 12 (see FIG. 3) is, for example, an electric power steering system or a steer-by-wire (SBW) system. As illustrated in FIG. 3, the steering system 12 adds torque (assist torque) to the steering 4 by an actuator 12a to steer the front wheels 3F.

In the present embodiment, for example, as illustrated in FIG. 2, the vehicle 1 (vehicle body 2) is provided with a plurality of (in the present embodiment, four) imagers 16 (16a to 16d). The imagers 16 are, for example, digital cameras incorporating image pickup elements such as a charge coupled device (CCD) or a CMOS image sensor (CIS). The imagers 16 can output captured image data (motion image data, frame data) at a predetermined frame rate. Each of the imagers 16 includes a wide-angle lens and can pick up (capture) images in a horizontal range (viewing angle) of, for example, 140° to 220°. The optical axes of the imagers 16 are set to extend downward (for example, vertical direction or obliquely downward). Thus, the imagers 16 can pick up an ambient environment around the vehicle body 2 including the road surface on which the vehicle 1 can move and the region above the road surface.

In the present embodiment, for example, the imager 16a is provided to, for example, a front grille at a front end 2c (in a plan view) of the vehicle body 2 (the front side in vehicle front-back direction). The imager 16b is provided to a left-side door mirror 2g (protrusion) at a left end 2d (in vehicle width direction) of the vehicle body 2. The imager 16c functioning as a first imager is provided to a bottom wall of a door 2h of a rear trunk at a rear end 2e (in vehicle front-back direction) of the vehicle body 2. The imager 16d is provided to a right-side door mirror 2g (protrusion) at a right end (in the vehicle width direction) 2f of the vehicle body 2. The present embodiment does not intend to limit how the cameras are mounted on the vehicle and the cameras can be arbitrarily placed as long as they can capture image data forward, laterally, and rearward relative to the vehicle.

A periphery monitoring ECU 14 (see FIG. 3) can perform calculation and image processing on the basis of image data captured by the imagers 16, and display the captured image data having undergone the image processing, on the display device 8. Although described later, the image data captured by the imager 16a, which captures (picks up) the area ahead of the vehicle, for example, is used as a current image showing a current situation around the vehicle. The captured image data as the current image is stored and a past image is displayed using the captured image data showing a past situation of the underfloor or surroundings of the vehicle.

In the present embodiment, for example, as illustrated in FIG. 3, in a periphery monitoring system (periphery monitoring device) 100, the periphery monitoring ECU 14 (electronic control unit), the monitor device 11, a brake system 18, a rudder angle sensor 19 (angular sensor), an accelerator sensor 20, a shift sensor 21, a wheel speed sensor 22, and an acceleration sensor 26 are connected electrically through an in-vehicle network 23 (electric communication line). The in-vehicle network 23 is configured as, for example, a controller area network (CAN). The periphery monitoring ECU 14 can control the brake system 18 and other elements by transmitting a control signal through the in-vehicle network 23. The periphery monitoring ECU 14 can receive results of detection from a torque sensor 12b, a brake sensor 18b, the rudder angle sensor 19, the accelerator sensor 20, the shift sensor 21, the wheel speed sensor 22, and the acceleration sensor 26 through the in-vehicle network 23 and the periphery monitoring ECU 14 can receive command signals (control signal, operation signal, input signal, data) from the manipulation input 10, for example.

In the present embodiment, the vehicle 1 includes two acceleration sensors 26 (26a, 26b). In the present embodiment, the vehicle 1 is provided with electronic stability control (ESC). The vehicle 1 employs the acceleration sensors 26 (26a, 26b) that have been conventionally mounted in the ESC-mounted vehicle. The present embodiment does not intend to limit the acceleration sensors and the acceleration sensors may be any sensors that can detect the acceleration of the vehicle 1 in the horizontal direction. In the present embodiment, the acceleration sensors derive the acceleration in the front-back direction and the horizontal direction.

The periphery monitoring ECU 14 includes, for example, a central processing unit (CPU) 14a, a read only memory (ROM) 14b, a random access memory (RAM) 14c, a display controller 14d, a sound control 14e, and a solid state drive (SSD, flash memory) 14f. For example, the CPU 14a performs image processing to images for display on the display device 8 and various kinds of calculation including calculation of moving routes of the vehicle 1 and determination as to whether the vehicle interferes with an object. The CPU 14a reads out programs stored (installed) from a nonvolatile storage device such as the ROM 14b, and performs calculation in accordance with the programs. The RAM 14c is one example of a first storage. The SSD 14f is one example of a second storage that is nonvolatile.

The RAM 14c temporarily stores therein various kinds of data used in the calculation in the CPU 14a. The display controller 14d mainly performs, among the calculation in the periphery monitoring ECU 14, image processing on the image data captured by the imagers 16 and image processing (for example, synthesis) on the captured image data to display on the display device 8. Among the calculation in the periphery monitoring ECU 14, the sound control 14e mainly processes sound data output from the sound output device 9. The SSD 14f is a rewritable nonvolatile storage that can store therein data even during the power-off of the periphery monitoring ECU 14. The CPU 14a, the ROM 14b, and the RAM 14c can be integrated in one package. The periphery monitoring ECU 14 may include another arithmetic logic processor or logic circuit such as a digital signal processor (DSP) in replace of the CPU 14a. In addition, the SSD 14f as the nonvolatile second storage may be replaced by a hard disk drive (HDD), or the SSD 14f or the HDD may be provided separately from the periphery monitoring ECU 14.

Figure 4:
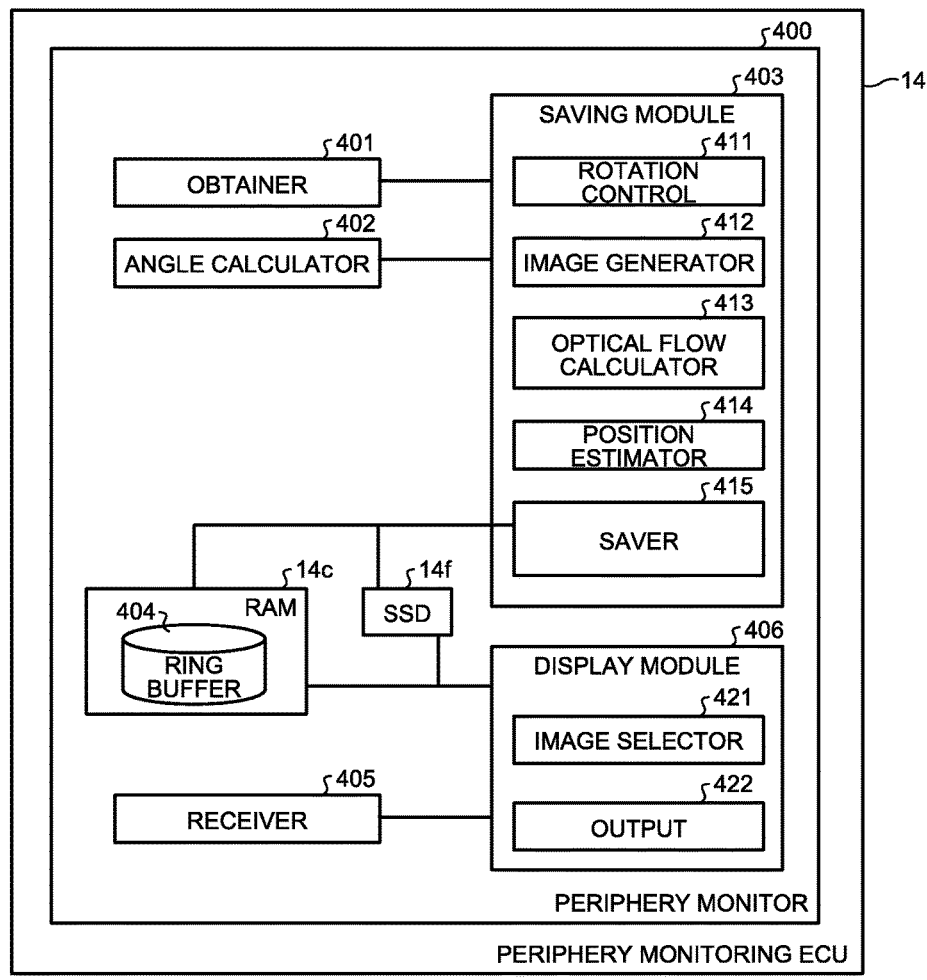
FIG. 4 is a block diagram illustrating a structure of a periphery monitor implemented in a periphery monitoring ECU of the periphery monitoring device according to the embodiment.

FIG. 4 is a block diagram illustrating a structure of a periphery monitor 400 implemented in the periphery monitoring ECU 14 according to the present embodiment. The CPU 14a configured as the periphery monitoring ECU 14 in FIG. 3 executes software stored in the ROM 14b (computer readable storage medium), to implement an obtainer 401, an angle calculator 402, a saver 403, a receiver 405, and a display processor 406, as illustrated in FIG. 4. The software (program) can be provided through another computer readable storage medium. Moreover, the periphery monitor 400 implements a ring buffer 404 on the RAM 14c.

Figure 5:
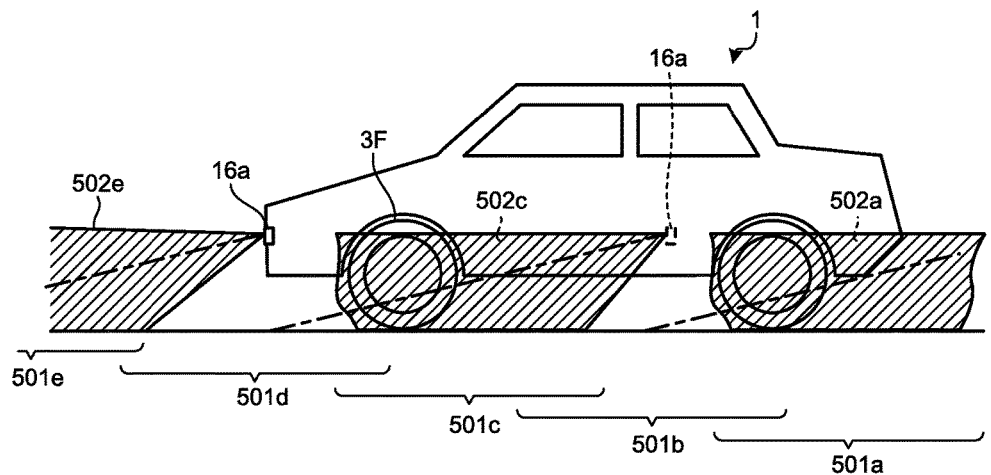
FIG. 5 is a side view illustrating an image region captured by an imager of the vehicle according to the embodiment.
Figure 6:
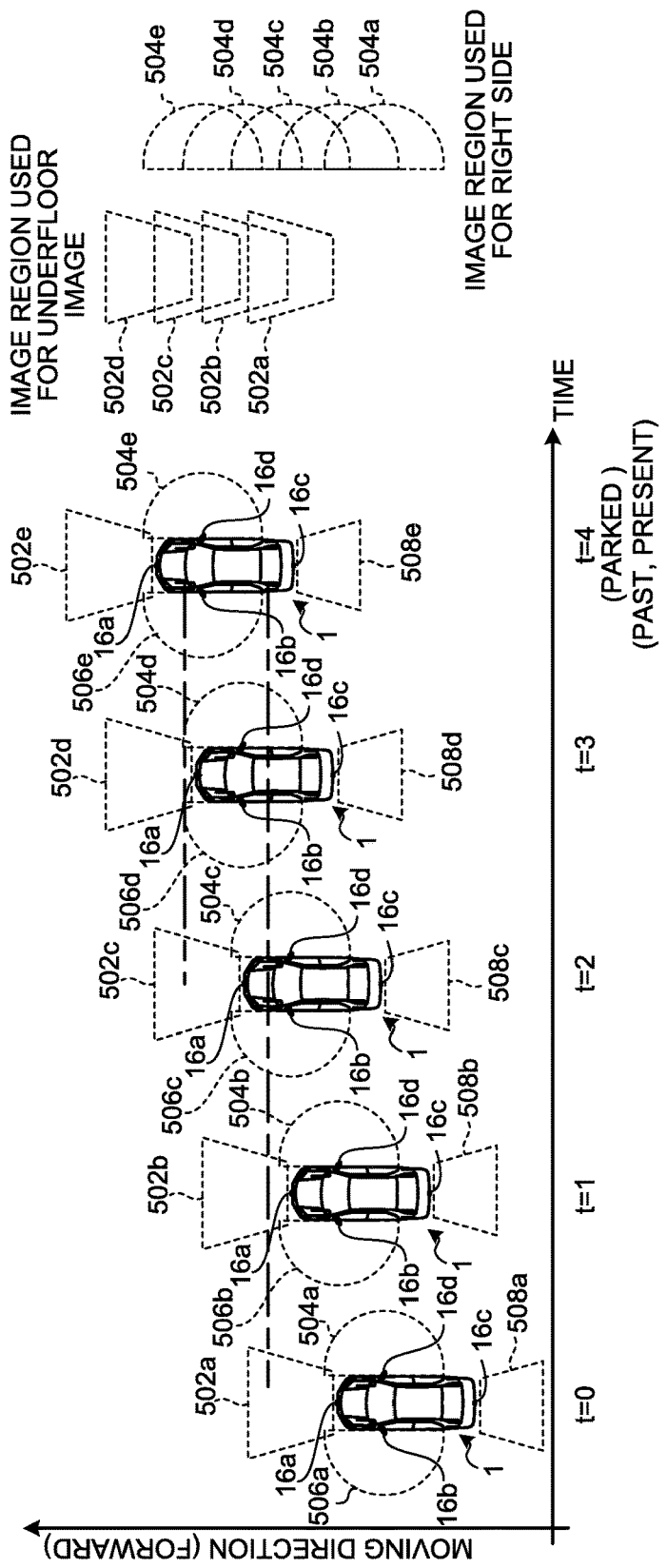
FIG. 6 is a plan view of image regions captured at each time by imagers of the vehicle including the periphery monitoring system according to the present embodiment.

FIG. 5 is a side view of an image region captured by the imager 16a of the vehicle 1 according to the present embodiment. FIG. 6 is a plan view of image regions captured at each time by the imagers 16 of the vehicle 1 including the periphery monitoring system 100 according to the present embodiment. At time t=4 in FIG. 6, the vehicle 1 is in a parked state. Thus, the state of the vehicle 1 at time t=4 in FIG. 6 can be regarded as a parked state in the past or a current state of the vehicle 1 that starts moving from the parked state. At time t=0 to 3 in FIG. 6, the vehicle 1 moving ahead is about to be parked.

As illustrated in FIG. 5 and FIG. 6, the imager 16a images the road surface in the moving direction of the vehicle 1 and a region above the road surface (opposite to gravity direction), at least a region including the horizon. However, an image region 502e, currently captured by the imager 16a, does not contain a road surface 501 near the wheels 3 of the vehicle 1 that is parked or stops. It is difficult to set the image region to include an underfloor region near the front wheels 3F due to the location of the bumper of the vehicle 1 (because of the structure of the vehicle 1), for example.

Thus, it is difficult for the driver (user) in the parked vehicle 1 to check whether there is an obstacle 560 (see FIG. 9) near the front wheels 3F of the vehicle 1, even while viewing currently captured image data. In view of this, in the present embodiment, the periphery monitor 400 functioning as a controller can display an image generated from image data captured in the past by the imager 16a. The captured image data in the past refers to image data captured from behind the current position of the vehicle 1, and can be, for example, captured image data of the underfloor region or a part of the underfloor region at the current position of the vehicle 1 (for example, parked position) in the examples illustrated in FIG. 5 and FIG. 6. The underfloor region is a region vertically below the vehicle 1, that is, a region of the road surface onto which the vehicle 1 is projected. Thus, when the vehicle 1 travels forward, past image data captured and generated by the imager 16a from the region including the road surface is one example of road surface information that is information on the road surface in the vehicle moving direction, and a captured image of the road surface.

For example, the periphery monitor 400 may present to the driver the image of an image region 502c captured at time t=2 as an image of image data captured by the imager 16a from behind the vehicle 1 moving ahead immediately before reaching a parked position of the vehicle 1 at time t=4). Since the image region 502c includes a road surface 501c, the driver can check the road surface 501c near the front wheels 3F. The periphery monitor 400 may present to the driver the image of an image region 502a captured at time t=0, as an image of image data captured by the imager 16a from further behind the vehicle 1 moving forward. Since the image region 502a includes a road surface 501a, the driver can check the road surface 501a near the rear wheels 3R. The periphery monitor 400 may present to the driver the image of an image region 502b captured at time t=1, as an image of image data captured by the imager 16a from behind the vehicle 1 moving forward. Since the image region 502b includes a road surface 501b, the driver can check the road surface 501b between the front wheels 3F and the rear wheels 3R. The periphery monitor 400 may present to the driver the image of the image region 502d at time t=3 as the image of image data captured from behind the vehicle 1 moving forward by the imager 16a. Since the image region 502d includes a road surface 501d, the driver can check the road surface 501d ahead of the front wheels 3F.

The periphery monitor 400 may also generate laterally ambient images from the past captured image data of the vehicle 1 moving forward immediately before parking and provide them to the driver. The periphery monitor 400 may present to the driver images of image regions 504a, 504b, 504c, 504d, and 504e captured at time t=0, 1, 2, 3, and 4, respectively, as an image of image data of a rightward periphery captured by the imager 16d from behind the vehicle 1 moving forward (the position before reaching the parked position of the vehicle 1). Since the image regions 504a to 504e include a region which cannot be captured by the imager 16d at one time, the periphery monitor 400 can provide the driver an ambient image of a wider region. Similarly, the periphery monitor 400 may present to the driver images of image regions 506a, 506b, 506c, 506d, and 506e captured at time t=0, 1, 2, 3, and 4, respectively, as an image of captured image data of a leftward periphery. With a decrease in processing load required, however, only the image of the image region 504e may be displayed.

The periphery monitor 400 may also generate a rear ambient image from the past captured image data of the vehicle 1 moving forward immediately before parking for providing it to the driver. The periphery monitor 400 may provide the driver images of the image regions 508a, 508b, 508c, 508d, and 508e captured at time t=0, 1, 2, 3, and 4, respectively, as an image of image data of a rearward periphery of the vehicle 1 captured by the imager 16c from behind the vehicle 1 moving forward (before reaching the parked position of the vehicle 1). Since the image regions 508a to 508e include a region which cannot be captured by the imager 16c at one time, the periphery monitor 400 can provide the driver the image of captured image data of a wider region. This enables the driver to drive upon understanding the conditions of the road surface 501 and its surroundings, and easily recognize the obstacle 560, which can reduce a load on the driver.

Referring back to FIG. 4, the structure of the periphery monitor 400 is described next. The obtainer 401 obtains various kinds of information from various sensors of the vehicle 1. The obtainer 401 according to the present embodiment obtains captured image data output from the imagers 16a to 16d of the vehicle 1 that capture the ambient images of the vehicle 1, and acceleration data output from the acceleration sensors 26a and 26b of the vehicle 1. The obtainer 401 outputs the obtained information to the angle calculator 402 and the saving module 403.

The obtainer 401 associates the captured image data with the acceleration data whose captured time and acceleration detected time approximately coincide.

The angle calculator 402 calculates the tilt angle of the vehicle 1 (pitch angle and roll angle) on the basis of the acceleration data obtained by the acceleration sensors 26a and 26b. The pitch angle refers to the angle of a tilt around the horizontal axis of the vehicle 1, and the roll angle refers to the angle of a tilt around the lengthwise axis of the vehicle 1.

The angle calculator 402 calculates the pitch angle and the roll angle from the acceleration data and associates them with the captured image data associated with the acceleration data. Thus, the roll angle and the pitch angle of the vehicle 1 at the time of capturing the image data can be identified.

The saving module 403 includes a rotation control 411, an image generator 412, an optical flow calculator 413, a position estimator 414, and a saver 415, to generate image data to display on the display device 8 and save the generated image data together with the image data picked up (captured) by the imagers 16.

The rotation control 411 performs rotation correction to the image data, captured by the imager 16a, including the surroundings ahead of the vehicle 1 (in the moving direction).

The rotation control 411 according to the present embodiment performs rotation correction to the captured image data in accordance with the roll angle associated with the captured image data, with position coordinates in the display region of the captured image data set as the origin, the position coordinates corresponding to the center of an imaging lens of the imager 16a. The subject of the rotation correction is not limited to the captured image data by the imager 16a and may be, for example, captured image data by the imager 16c including surroundings behind the vehicle 1.

The image generator 412 generates, from the captured image data, bird's eye view image data of an underfloor image that shows the ground in the moving direction of the vehicle 1 and around the vehicle 1 from above. The image generator 412 may generate the bird's eye view image data using the captured image data that has been subjected to the rotation correction. An arbitrary method may be employed for generating the bird's eye view image data from the captured image data, for example, conversion using a mapping table. The image generator 412 may additionally generate two-dimensional image data of the underfloor image from the bird's eye view image data.

The bird's eye view image data may be generated every time the captured image data is obtained. In other words, the image generator 412 may generate first bird's eye view image data on the basis of first captured image data after the rotation correction by the rotation control 411, and then generate second bird's eye view image data on the basis of second captured image data. The second captured image data is captured by the imagers 16 and subjected to the rotation correction by the rotation control 411 after the vehicle 1 moves after picking up (capturing) the first captured image data.

The optical flow calculator 413 calculates an optical flow on the basis of the bird's eye view image data calculated by the image generator 412. The optical flow is information indicating the motion of an object in the bird's eye view image data by vector. By calculating the optical flow, the amount of movement of the vehicle 1 can be estimated.

The optical flow calculator 413 according to the present embodiment compares the bird's eye view image data generated by the image generator 412 and the bird's eye view image data used in a previous update to calculate the optical flow. The optical flow calculator 413 may alternatively compare image data from the imagers 16 or a part thereof for the optical flow calculation.

However, making comparison with the entire bird's eye view image data results in larger processing load. In view of this, the optical flow calculator 413 according to the present embodiment uses a preset area of the bird's eye view image data generated by the image generator 412 for the comparison.

Specifically, the optical flow calculator 413 according to the present embodiment cuts out a preset area from each of the first bird's eye view image data used in the previous update and the second bird's eye view image data generated after the first bird's eye view image data, to calculate the optical flow. Alternatively, the bird's eye view of only the preset area may be generated.

Figure 7:
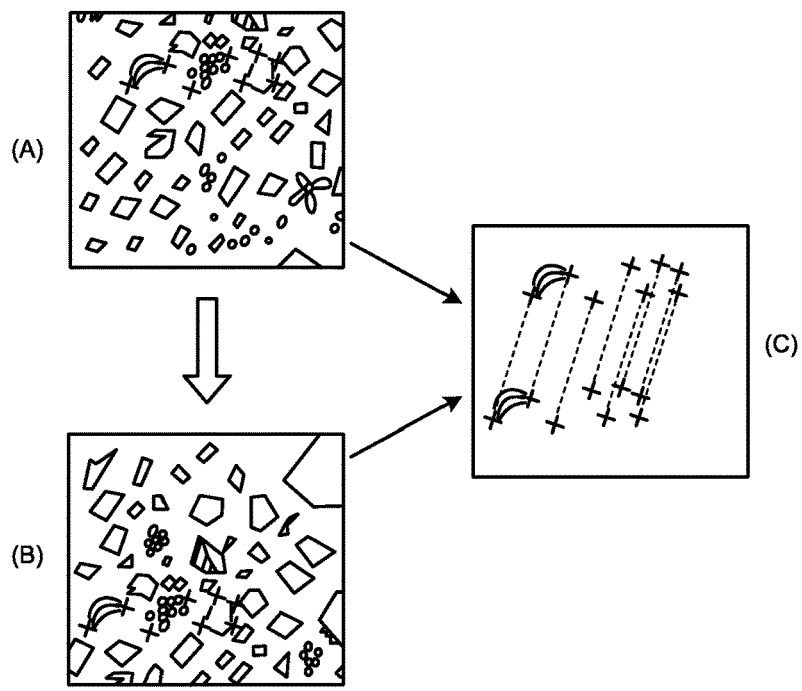
FIG. 7 is a diagram illustrating a conceptual optical flow calculated by an optical flow calculator of the periphery monitoring device according to the embodiment.

FIG. 7 is a diagram illustrating a conceptual optical flow calculated by the optical flow calculator 413. (A) in FIG. 7 illustrates image data of a predetermined area cutout from the first bird's eye view image data used in the previous update, and (B) in FIG. 7 illustrates image data of a predetermined area cutout from the second bird's eye view image data currently generated by the image generator 412. The optical flow calculator 413 calculates the optical flow indicating, by vector, the transition of (feature points of) a displayed object between the image data illustrated in (A) in FIG. 7 and the image data illustrated in (B) in FIG. 7. (C) in FIG. 7 illustrates an example of calculated optical flow. The example illustrated in (C) in FIG. 7 shows vector lengths of the movement from the feature points (indicated by cross mark) in (A) in FIG. 7 to the feature points (indicated by cross mark) in (B) in FIG. 7.

The position estimator 414 calculates the amount of movement of the vehicle 1 from the average value of the optical flow calculated by the optical flow calculator 413, to estimate a current position of the vehicle 1. The amount of movement may be calculated directly from each of the detected optical flows.

In the present embodiment, the current position of the vehicle 1 is estimated from the optical flow. The situation that the driver wishes to know the underfloor condition of the vehicle 1, such as in the vicinity of the front wheels 3F of the vehicle 1, may likely be off-road running. In the off-road running, for example, the wheels 3 may idly run, affected by a rough road surface. In this case, error is likely to occur in the amount of movement of the vehicle 1 estimated from the rotation speed of the wheels 3. In view of this, in this embodiment, the amount of movement and the position of the vehicle 1 are estimated from the optical flow. With no slip of the wheels 3, the amount and direction of movement may be calculated from the steering angle and the rotation speed of the wheels 3 to estimate the current position.

If the amount of movement of the vehicle 1 after a previous saving satisfies a condition, that is, a threshold distance or more, the saver 415 saves the captured image data corrected by the rotation control 411, in the ring buffer 404 together with positional information on the vehicle 1. In the present embodiment, the threshold distance is not limited to a particular distance and may be, for example, 0.3 m or 0.5 m.

Figure 8:
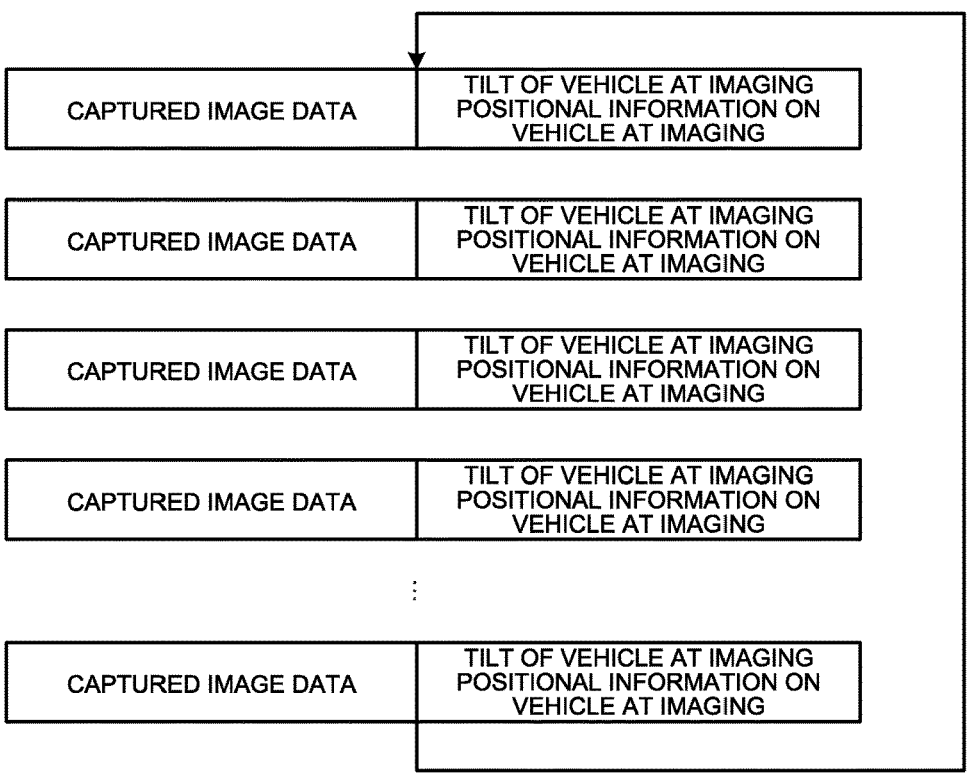
FIG. 8 is a diagram illustrating a structure of a ring buffer of the periphery monitoring device according to the embodiment.

The ring buffer 404 stores therein currently captured image data output from the imager 16 in association with information at the time of imaging. FIG. 8 illustrates the structure of the ring buffer 404. As illustrated in FIG. 8, the ring buffer 404 stores therein every piece of captured image data by the imagers 16a to 16d, the tilt and positional information of the vehicle 1 at the time of capturing image data in question (in the moving direction), in association with one another.

As illustrated in FIG. 8, the ring buffer 404 refers to buffers disposed in a ring-like form logically. In the ring buffer 404, captured image data in question is overwritten to a most previously updated region in response to a saving request from the saver 415.

Referring back to FIG. 4, the receiver 405 receives a command signal (control signal) from the manipulation input 10, for instance. One example of the command signal is a command signal for switching the display of a current image and a past image, as described below.

The display module 406 includes an image selector 421 and an output 422. In accordance with a manipulation of the receiver 405, the display module 406 performs display process to the display device 8.

With no current image display command received by the receiver 405, the image selector 421 selects a past image stored in the SSD 14f for display. Upon receipt of a current image display command by the receiver 405, the image selector 421 selects a current image generated from currently captured image data and the underfloor image stored in the SSD 14f for display.

The output 422 displays the current image or the past image selected by the image selector 421 on the display device 8.

Figure 9:
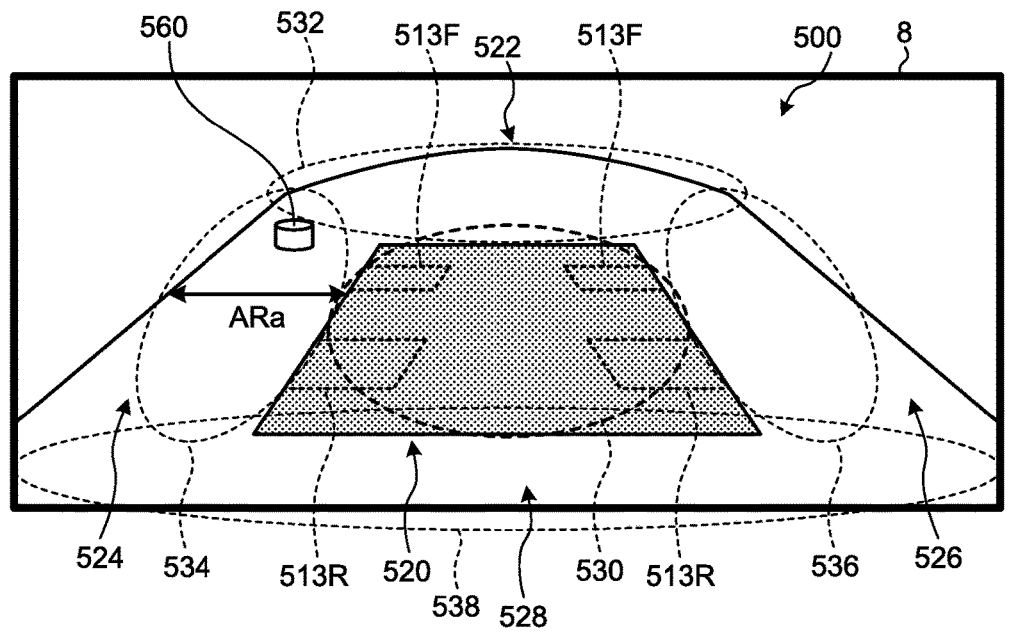
FIG. 9 is a diagram illustrating one example of an image displayed on the display device by the periphery monitoring device according to the embodiment.

FIG. 9 illustrates one example of the image displayed on the display device 8 by the periphery monitoring system 100 according to the embodiment. In FIG. 9, an underfloor image 520 is drawn by dot hatching. As illustrated in FIG. 9, for example, when the vehicle 1 is placed in driving ON state, the periphery monitor 400 displays, on the display device 8, a past image 500 that is a combination of the underfloor image 520 and past ambient images 522, 524, 526, and 528 at the service of the driver. The underfloor image 520 is one example of underfloor information. The underfloor image 520 is an image of an underfloor region 530 of the road surface 501 below the parked vehicle 1. The past ambient images 522, 524, 526, and 528 are images representing information around the vehicle 1 before the vehicle 1 is placed in driving OFF state. The past ambient images 522, 524, 526, and 528 are one example of past ambient information. In the example illustrated in FIG. 9, the underfloor image 520 is a current image of the underfloor region including all the regions of the wheels 3 in the parked state. All the regions of the wheels 3 refer to, for example, regions of the road surface 501 onto which all the wheels 3 are projected. In the example illustrated in FIG. 9, the periphery monitor 400 displays the underfloor image 520 in bird's eye view but may alternatively display the underfloor image 520 in another view such as plan view.

The driving ON state is an example of driving start of the vehicle 1. The driving ON state refers to a state of the vehicle 1 that is ready to supply power to general electronic devices including a meter, a light, an air conditioner, and a car navigation system, and to an ON state of a switch such as an ignition switch. The driving ON state may also refer to a turning-on of, for example, the power source for moving the vehicle 1, such as the internal-combustion engine (for example, engine) or the electric motor (for example, motor).

The driving OFF state is an example of stop of the driving of the vehicle 1. The driving OFF state refers to a state of the vehicle 1 that starts stopping power supply to general electronic devices including a meter, a light, an air conditioner, and a car navigation system, and to a turning-off of a switch such as an ignition switch. The driving OFF state may also refer to a turning-off of, for example, the power source for moving the vehicle 1, such as the internal-combustion engine (for example, engine) or the electric motor (for example, motor).

For example, in the periphery monitor 400, the image generator 412 synthesizes the images of the image data of the image regions 502a to 502d captured at different times, on the basis of the positional information on the vehicle 1, so as to generate one underfloor image 520 including the entire underfloor region of the vehicle 1. The periphery monitor 400 may generate the underfloor image 520 on the basis of steering angle data obtained from the rudder angle sensor 19 together with the positional information on the vehicle 1. The image generation 412 may superimpose wheel images 513, showing the positions of the wheels 3, on the current positions of the wheels 3 in a region of the underfloor image 520. In the example illustrated in FIG. 9, wheel images 513F correspond to the images of the front wheels 3F and wheel images 513R correspond to the images of the rear wheels 3R. The wheel images 513S may be tilted leftward or rightward on the basis of the information obtained by the rudder angle sensor 19.

The image generator 412 generates the ambient image 522 of a front region 532 from the captured image data of the image region 502e. The image generator 412 synthesizes the captured image data of the image regions 504a to 504e on the basis of the positional information on the vehicle 1, so as to generate the ambient image 526 of a right region 536. The image generator 412 synthesizes the captured image data of the image regions 506a to 506e on the basis of the positional information on the vehicle 1, so as to generate the ambient image 524 of a left region 534. The image generator 412 synthesizes the captured image data of image regions 508a to 508e on the basis of the positional information on the vehicle 1, so as to generate the ambient image 528 of a rear region 538. The image generator 412 synthesizes the underfloor image 520 and the front, back, left, and right ambient images 522, 528, 524, and 526, so as to generate the past image 500. A size ARa of the regions of the past ambient images 522, 528, 524, and 526 is, for example, 50 cm from the actual periphery of the vehicle 1. The image generator 412 may add a condition for the generation of the underfloor image 520 and the past image 500 that the speed of the vehicle 1 is less than a threshold, for example, less than several kilometers per hour. This enables the image generator 412 to omit any unnecessary image generation except for the one at the time of parking the vehicle 1.

In the periphery monitor 400, the saver 415 stores the past image 500 and the underfloor image 520 generated by the image generator 412 in the RAM 14c. When the vehicle 1 is placed in the driving OFF state, the saver 415 stores, in the SSD 14f, the past image 500 and the underfloor image 520 stored in the RAM 14c. The saver 415 may delete the captured image data after storing the underfloor image 520 and the past image 500 in the SSD 14f. This enables the periphery monitor 400 to reduce the storage capacity necessary to generate the underfloor image, for example.

Figure 10:
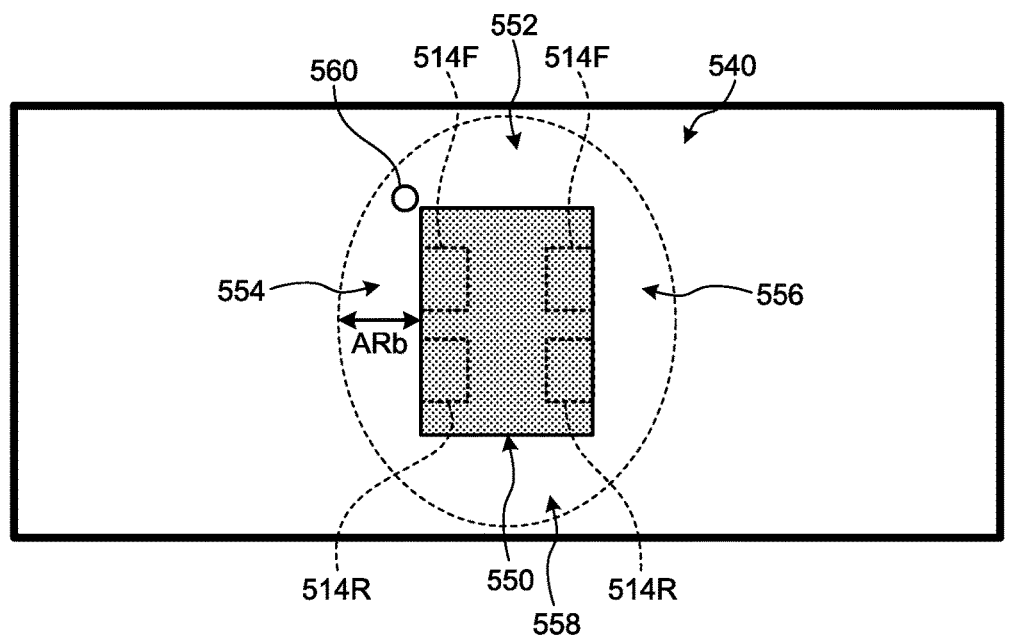
FIG. 10 is a diagram illustrating another example of an image displayed on the display device by the periphery monitoring device according to the embodiment.

FIG. 10 is a diagram illustrating another example of the image displayed on the display device 8 by the periphery monitoring system 100 according to the embodiment. The periphery monitor 400 may display, on the display device 8, as a current image 540, a synthetic image of an underfloor image 550 and current ambient images 552, 554, 556, and 558 corresponding to image data of the surroundings currently captured by the imagers 16, after the vehicle 1 is placed in the driving ON state. The image data of the surroundings currently captured by the imagers 16 correspond to one example of current ambient information on the vehicle 1. The current ambient images 552, 554, 556, and 558 are one example of current ambient information. The current image 540 is one example of synthetic information. In the example illustrated in FIG. 10, the periphery monitor 400 displays the underfloor image 550 in plan view, but may alternatively display the underfloor image in another view such as bird's eye view. The underfloor image 550 and wheel images 514 are converted images in plan view from the above underfloor image 520 and wheel images 513, respectively.

In the example of the current image 540 illustrated in FIG. 10, the image generator 412 generates the ambient image 552 of the front region from ambient image data currently captured by the imager 16a. The image generator 412 generates the ambient images 554 and 556 of the lateral regions from the ambient image data currently captured by the imagers 16d and 16b. The image generator 412 generates the ambient image 558 of the rear region from an ambient image currently captured by the imager 16c. The image generator 412 generates the current image 540 by synthesizing the underfloor image 550 and the ambient images 552, 554, 556, and 558. The size ARb of the regions of the ambient images 552, 554, 556, and 558 is, for example, 2 m around the vehicle 1.

In the current image 540 illustrated in FIG. 10, the periphery monitor 400 may display, on the display device 8, the underfloor image 550 as a past image and the ambient images 552, 554, 556, and 558 as a current image in different formats. For example, the periphery monitor 400 may display the images in different formats by changing the color of the images. In this case, the periphery monitor 400 selects one of a group of a monochromatic image, a gray image, and a sepia image and displays the underfloor image 550 in the selected image format, and displays the current ambient images 552, 554, 556, and 558 in colors (for example, color image representing captured colors as they are).

The periphery monitor 400 may change the display formats for the past image 500 and for the current image 540. For example, as explained above, the periphery monitor 400 may display the past image 500 in bird's eye view and display the current image 540 in plan view. For another example, the periphery monitor 400 may display the images in different colors. For example, the periphery monitor 400 may select one of the group of a monochromatic image, a gray image, and a sepia image to display the past image 500 in the selected image format.

Figure 11:
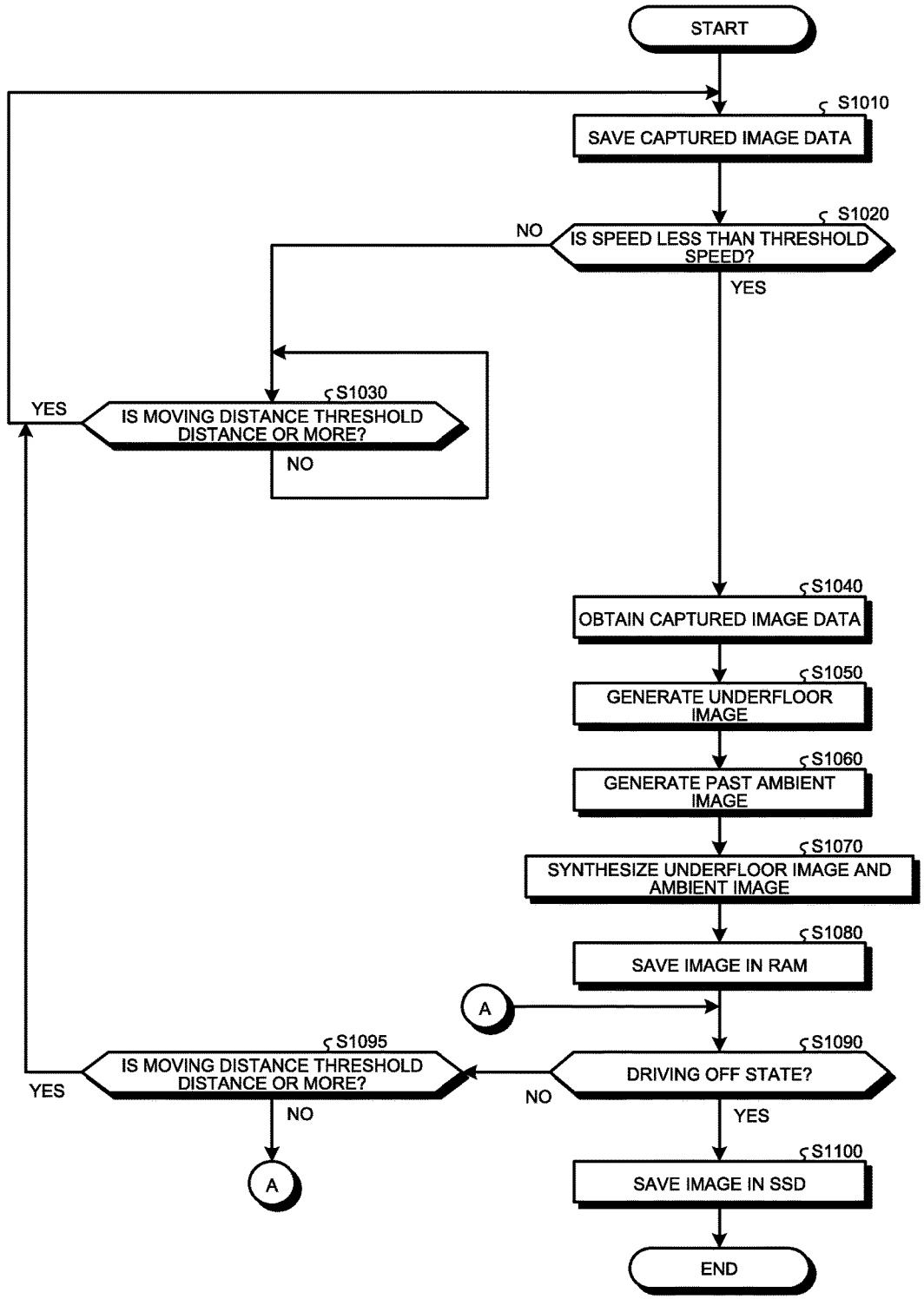
FIG. 11 is a flowchart illustrating steps of a generation process in the periphery monitoring device according to the embodiment.

Description is made of a process for generating the past image 500 by the periphery monitor 400 in the present embodiment. FIG. 11 is a flowchart illustrating steps of the generation process of the periphery monitoring system 100 according to the embodiment.

As illustrated in FIG. 11, in the generation process for the past image 500, the saver 415 saves the captured image data by the imagers 16 in the ring buffer 404 (S1010).

Next, the saver 415 determines whether the speed of the vehicle 1 is less than a threshold speed (S1020). In other words, in S1020, the saver 415 determines whether the vehicle 1 is about to be parked. When determining that the speed of the vehicle 1 is not less than the threshold speed, that is, the vehicle 1 is not about to be parked (No at S1020), the saver 415 determines whether the vehicle 1 has moved by a threshold distance or more from the position where previously captured image data has been saved (S1030). One example of the threshold distance is at least the length of the image region of the imagers 16 in the moving direction. For example, the saver 415 may compare the threshold distance and the amount of movement estimated from the optical flow calculated by the optical flow calculator 413 to determine Step S1030.

The saver 415 remains in a standby state until it determines that the vehicle 1 has moved by the threshold distance or more (No at S1030). When determining that the vehicle 1 has moved by the threshold distance or more (Yes at S1030), the saver 415 returns to Step S1010 and saves another captured image data. Here, the threshold distance is more than or equal to the length of the image region of the imagers 16 in the moving direction; therefore, the saver 415 can save sets of captured image data partly overlapping with each other in the moving direction. If the ring buffer 404 stores captured image data in full capacity, the saver 415 deletes most previously captured image data and saves newly captured image data. The saver 415 may save the newly captured image data in consideration of a result of comparison between the steering angle of the vehicle 1 and a predetermined threshold angle (for example, 2 degrees) together with the threshold distance. Thereafter, the saver 415 repeats Step S1010 until it determines that the speed is less than the threshold speed.

When the saver 415 determines that the speed of the vehicle 1 is less than the threshold speed, that is, the vehicle 1 is about to be parked (Yes at S1020), the image generator 412 obtains the sets of captured image data from the ring buffer 404 (S1040).

Next, the image generator 412 converts sets of image data of the road surface 501 captured at different times by the imager 16a, into the bird's eye view, and then synthesizes the images to generate the underfloor image 520 (S1050). Next, the image generator 412 synthesizes the image data captured by the imagers 16a to 16d to generate the past ambient images 522, 528, 524, and 526 (S1060). The image generator 412 synthesizes the underfloor image 520 and the past ambient images 522, 528, 524, and 526 to generate the past image 500 as illustrated in FIG. 9 (S1070). The saver 415 saves the underfloor image 520 and the past image 500 in the volatile RAM 14c (S1080).

Next, the saver 415 determines whether the driving state is an off-state (S1090). Upon determining that the driving state is not an off-state (No at S1090), the saver 415 determines whether the vehicle 1 has moved by the threshold distance or more from the position where previously captured image data has been saved, as with S1030 (S1095). Upon determining that the vehicle 1 has moved by the threshold distance or more (Yes at S1095), the saver 415 repeats the process at and after Step S1010. On the other hand, when determining that the vehicle 1 has not moved by the threshold distance or more (No at S1095), the saver 415 repeats Step S1090. When determining that the driving state is an off-state (Yes at S1090), the saver 415 obtains the underfloor image 520 and the past image 500 from the RAM 14c and saves the underfloor image 520 and the past image 500 in the nonvolatile SSD 14f (S1100).

Figure 12:
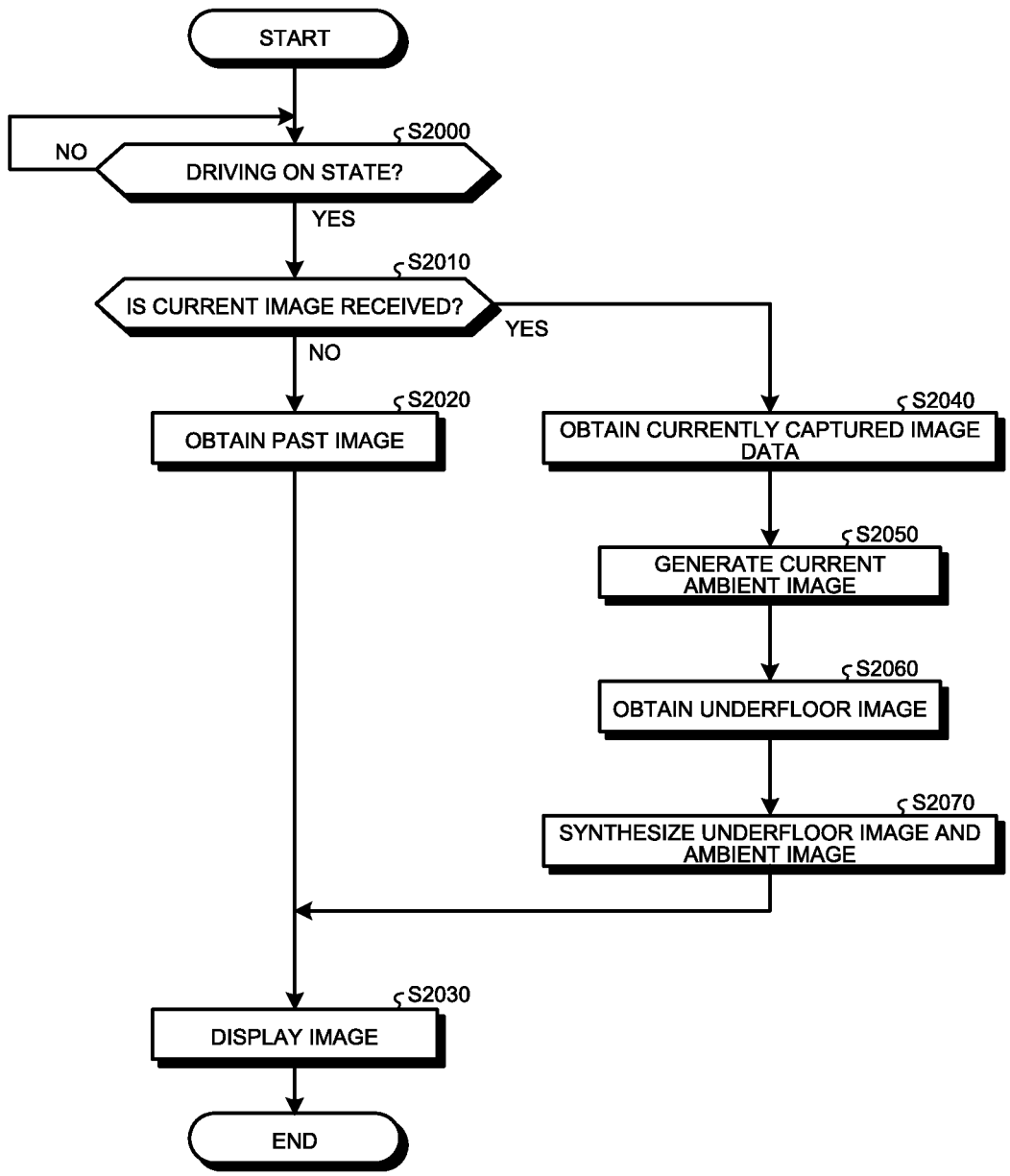
FIG. 12 is a flowchart illustrating steps of an image display process in the periphery monitoring device according to the embodiment.

Next, description is made of a process for displaying the images including the underfloor images 520 and 550 by the periphery monitor 400 according to the present embodiment. FIG. 12 is a flowchart illustrating the steps of the image display process of the periphery monitoring system 100 according to the present embodiment.

As illustrated in FIG. 12, in the image display process, the image selector 421 determines whether the driving state is an on-state (S2000). When determining that the driving state is an on-state (Yes at S2000), the image selector 421 determines whether the receiver 405 has received a current image display command (S2010). Upon determining that the receiver 405 has not received a current image display command (No at S2010), the image selector 421 obtains the past image 500 from the SSD 14f and outputs the image to the output 422 (S2020). The output 422 displays the obtained past image 500 on the display device 8 (S2030), and the display process ends.

When determining that the receiver 405 has received the current image display command (Yes at S2010), the image selector 421 obtains currently captured image data from the image generator 412 in order to selectively display the current image 540 (S2040). The image generator 412 generates the current ambient images 552, 554, 556, and 558 from the obtained image data (S2050). The image generator 412 obtains the underfloor image 520 from the SSD 14f (S2060), synthesizes the underfloor image 520 and the current ambient images 552, 554, 556, and 558 to generate the current image 540 as illustrated in FIG. 9, and outputs the generated image to the output 422 (S2070). Here, the image generator 412 may change the image format of the underfloor image 550 being the past image included in the current image 540 from the image format of the ambient images 552, 554, 556, and 558. The output 422 displays the obtained current image 540 on the display device 8 (S2030), and the display process ends.

As described above, the periphery monitoring system 100 displays the underfloor images 520 and 550 including at least part of the regions of all the wheels 3 of the vehicle 1. Thereby, the periphery monitoring system 100 can provide the driver the underfloor images 520 and 550 of a wider area. In particular, since the underfloor images 520 and 550 include the entire region of all the wheels 3, the periphery monitoring system 100 can provide the driver the positions of wheel stoppers, flaps, or recesses on the road surface near the wheels 3.

When the driving state turns to an off-state, the periphery monitoring system 100 stores the underfloor image 520 in the SSD 14f. Thus, when the driving state turns to an on-state, the periphery monitoring system 100 can obtain the underfloor image 520 from the SSD 14f and quickly provide the images including the underfloor images 520 and 550.

The periphery monitoring system 100 can provide the driver the current image 540 including the underfloor image 550 as a past image and the ambient images 552, 554, 556, and 558 as a current image. Thus, the periphery monitoring system 100 can provide the underfloor image 550 that cannot be captured at the time of the provision, and can provide the latest situation by the ambient images 552, 554, 556, and 558.

To display the current image 540 including both the underfloor image 550 as a past image and the ambient images 552, 554, 556, and 558 as a current image, the periphery monitoring system 100 displays the underfloor image 550 in a different format from that of the ambient images 552, 554, 556, and 558, which makes it possible for the driver to easily recognize that the underfloor image 550 shows an underfloor condition in the past.

The periphery monitoring system 100 generates the past image 500 including the underfloor image 520 and the ambient images 522, 524, 526, and 528 before the driving OFF state, and stores the past image 500 in the SSD 14f in the driving OFF state. Thus, the periphery monitoring system 100 can quickly provide the past image 500 including the underfloor image 520 after the driving ON state, without obtaining current ambient information.

The periphery monitoring system 100 generates the underfloor images 520 and 550 from the image data captured before the vehicle 1 is parked. Thereby, the periphery monitoring system 100 does not need to additionally include an imager for capturing the underfloor images 520 and 550 alone, thus, can be simplified in structure.

A modification to part of the above embodiment is described.

Figure 13:
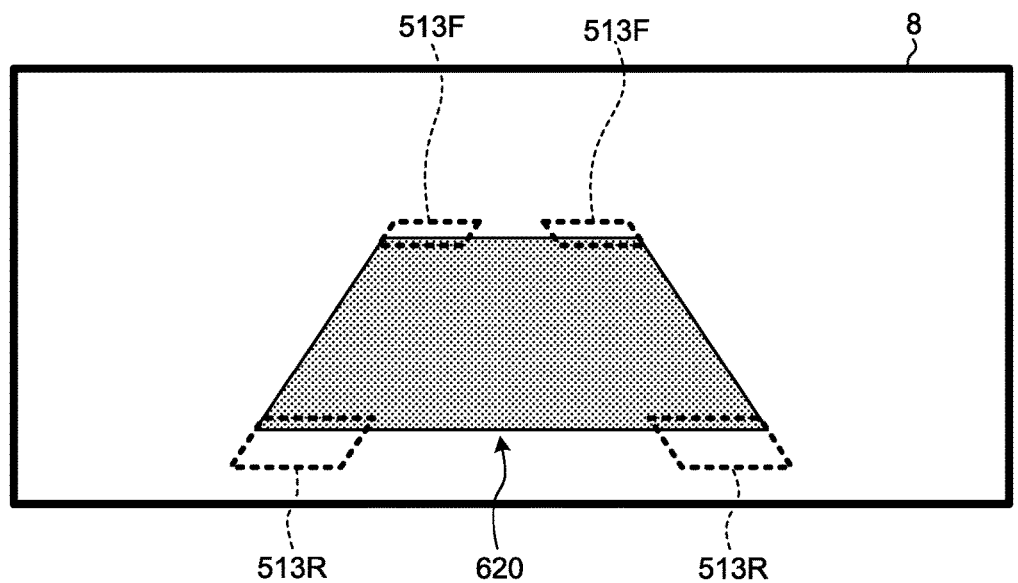
FIG. 13 is a diagram illustrating an example of an underfloor image displayed on the display device by the periphery monitoring device according to the embodiment.
Figure 14:
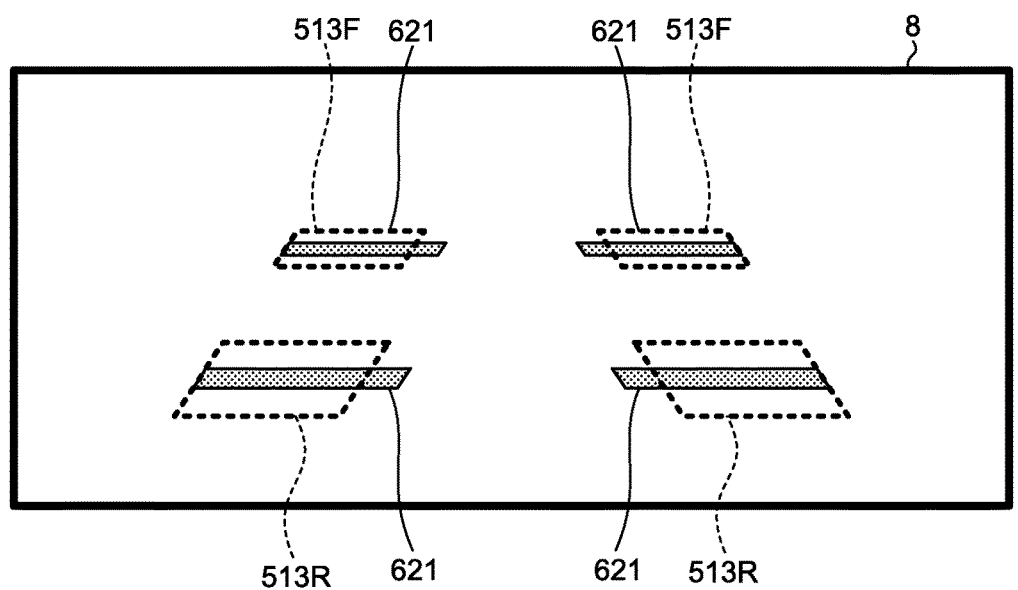
FIG. 14 is a diagram illustrating another example of an underfloor image displayed on the display device by the periphery monitoring device according to the embodiment.

In the periphery monitoring system 100, the periphery monitor 400 sets the image of approximately the entire underfloor region of the vehicle 1 as the underfloor images 520 and 550; however, the underfloor images are not limited to such images. The periphery monitor 400 may generate, from the captured image data as the road surface information, the underfloor image of the underfloor region of the vehicle 1 including at least part of the region of all the wheels 3 in the driving ON state. For example, the periphery monitor 400 may display, on the display device 8, as the underfloor information, an underfloor image 620 of the underfloor region of the vehicle 1 ranging from a rear end of the front wheels 3F to a front end of the rear wheels 3R in the moving direction of the vehicle 1. Even in this case, as illustrated in FIG. 13, the driver can be provided the underfloor image 620 of the region between the rear end of the wheel images 513F of the front wheels and the front end of the wheel images 513R of the rear wheels. The periphery monitor 400 may display, on the display device 8, as the underfloor information, an underfloor image 621 of the underfloor region of the vehicle 1 including a region in which all the wheels 3 connect a ground. Even in this case, as illustrated in FIG. 14, the driver can be provided with the underfloor image 621 as the underfloor information, the underfloor image which includes a central region of the wheel image 513 in the front-back direction as the region where all the wheels 3 connect a ground.

The periphery monitoring system 100 generates the current image 540 and the past image 500 including the underfloor images 520 and 550 from the captured image data obtained by the imagers 16. Alternatively, it may generate the current image 540 and the past image 500 based on the ambient information and the road surface information generated by a sensor other than the imagers 16. One example of the sensor includes a sonar or a radar. Based on the road surface information generated by such sensors, the underfloor image and the ambient image may be generated for display. In this case, for example, the per monitoring system 100 may display the underfloor images 520 and 550 representing wheel stoppers, flaps, or unevenness of the road surface such as recesses in the form of a line drawing, a polygonal image, or a three-dimensional map image. Another example of the device for generating the road surface information and the peripheral information may be a module in the periphery capable of communication, such as V2X. Alternatively, the road surface information and the ambient information may be generated by two or more devices selected from the imagers 16, a radar, a sonar, and a communication module. In this case, for example, the periphery monitoring system 100 may detect, by a radar, the obstacle 560 from the underfloor images 520 and 550 generated from the image data captured by the imagers 16, and highlight the image of the obstacle 560. In the case of using two or more sensors to generate the road surface information and the ambient information, the past image 500 may be displayed switchably to the underfloor image whose viewpoint is converted to the side of the vehicle 1, or an enlarged ambient image in the moving direction, for example.

The periphery monitoring system 100 described above saves the past image 500 and the underfloor image 520 generated from the captured image data, by way of example; however, it may convert the underfloor image 520 and the past image 500 into an edged or binarized line drawing or a codec stream for storage. Thereby, the periphery monitoring system 100 can reduce the saving capacity for the information corresponding to the underfloor image 520 and the past image 500.

When displaying the current image 540, the aforementioned periphery monitoring system 100 converts the underfloor image 550 as a past image into a monochromatic image or the like and displays it in a different display format from that of the current ambient images 552, 554, 556, and 558, by way of example. Alternatively, it may display the underfloor image 550 in another display format. For example, the underfloor image 550 may be displayed in a display format such as a line drawing, a transparent image, a semi-transparent image, or computer graphic information.

The periphery monitoring system 100 may provide the underfloor image 520 or the past image 500 including the underfloor image 520 to a portable high-performance terminal such as a smart phone or a tablet terminal upon condition that the vehicle 1 is unlocked. The periphery monitoring system 100 may provide the portable terminal the underfloor image 520 and the past image 500 in advance (for example, at the timing at which the underfloor image 520 and the past image 500 are saved in the SSD 14f).

The periphery monitoring system 100 can switch the display of the past image 500 including the underfloor image 520 and the past ambient images 522, 524, 526, and 528, and the current image 540 including the underfloor image 550 and the current ambient images 552, 554, 556, and 558 in accordance with a driver's instruction, by way of example; however, it may display only one of them.

The aforementioned periphery monitoring system 100 may save parking start time or driving-state OFF time along with the saving of the underfloor image 550. In this case, with a lapse of a long time from a previous driving (for example, several years), the periphery monitoring system 100 may omit the display of the past image 500 and the current image 540 irrespective of the driving ON state. With a lapse of a short time from a previous driving, the periphery monitoring system 100 may obtain luminance information at the time or the driving ON and display the past image 500 with updated luminance information, or may display the current image 540 including the underfloor image 550 and the current ambient images 552, 554, 556, and 558.

The aforementioned periphery monitoring system 100 generates one underfloor image including the entire underfloor region of the vehicle 1 from sets of image data captured at different times; however, using the imagers 6 having a wider image region, it may generate one underfloor image from one set of captured image data.

The aforementioned periphery monitoring system 100 generates the underfloor image 520 and the past image 500 when the speed of the vehicle 1 falls below the threshold speed, by way of example. Alternatively, it may generate the underfloor image 520 and the past image 500 after the driving OFF state.

The embodiment and the modification according to the present invention have been described; however, these embodiment and modification are just examples, and will not limit the scope of the invention. Novel embodiments can be embodied in various other modes and various omissions, replacements, and changes can be made without departing from the concept of the invention. These embodiment and modification thereof are included in the scope and concept of the invention and included in the invention described in the scope of claims and its equivalent scope.

The invention claimed is:

1. A periphery monitoring device comprising:
   a first storage that stores therein road surface information in a moving direction of a vehicle including a plurality of wheels, the road surface information being imaged by an imager of the vehicle;
   a controller that generates underfloor information on an underfloor region of the vehicle from the road surface information stored in the first storage, the underfloor region being a road surface previously imaged by the imager and including at least part of a region of the wheels of the vehicle in a current position on the previously imaged road surface;
   a second storage that is nonvolatile and stores therein, at the time of power-off of the vehicle, the underfloor information which is generated on the basis of a stop position of the vehicle; and
   a display that displays the underfloor information stored in the second storage, upon power-on of the vehicle.

2. The periphery monitoring device according to claim 1, wherein after the vehicle starts driving, the controller controls the display to display synthetic information in which of the underfloor information and current ambient information that corresponds to current ambient information on the vehicle are synthesized.

3. The periphery monitoring device according to claim 2, wherein the controller controls the display to display the underfloor information and the current ambient information in different formats.

4. The periphery monitoring device according to claim 1, wherein
   the road surface information is a captured image of a road surface;
   the current ambient information is a captured image of current surroundings of the vehicle; and
   the controller controls the display to display a combination of an image of the underfloor information in one image format and an image of the current ambient information in a color image format, the one image format being selected from an image format group of a monochromatic image, a gray image, and a sepia image.

5. The periphery monitoring device according to claim 1, wherein
   the second storage stores therein past ambient information that corresponds to ambient information on the vehicle before the vehicle ends driving; and
   the controller controls the display to display a combination of the road surface information and the past ambient information.

6. The periphery monitoring device according to claim 1, wherein the controller controls the display to display the underfloor information on the underfloor region of the vehicle, the underfloor region ranging from a rear end of a front wheel to a front end of a rear wheel in the moving direction of the vehicle.

7. The periphery monitoring device according to claim 1, wherein the controller controls the display to display the underfloor information on the underfloor region of the vehicle, the underfloor region including a region where all the wheels connect a ground.

8. A periphery monitoring device comprising according to claim 1, wherein
   the first storage is a volatile storage medium that stores the road surface information imaged by the imager, each time the vehicle moves in a certain distance.

* * * * *